(12) United States Patent
Thomas et al.

(10) Patent No.: US 9,315,325 B2
(45) Date of Patent: Apr. 19, 2016

(54) BELT FOR A CONVEYOR SYSTEM

(75) Inventors: Terry M. Thomas, Franklin, PA (US); Brian C. Ziegler, Franklin, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 154 days.

(21) Appl. No.: 13/473,949

(22) Filed: May 17, 2012

(65) Prior Publication Data

US 2013/0306444 A1 Nov. 21, 2013

(51) Int. Cl.
*B65G 15/34* (2006.01)
*B65G 15/36* (2006.01)

(52) U.S. Cl.
CPC ....................................... *B65G 15/36* (2013.01)

(58) Field of Classification Search
CPC ........................................................ B65G 15/34
USPC .......................................................... 198/847
See application file for complete search history.

(56) References Cited

U.S. PATENT DOCUMENTS

| | | | |
|---|---|---|---|
| 3,615,152 A | 10/1971 | Bouzat et al. | |
| 3,719,218 A * | 3/1973 | Leybourne, III | 152/527 |
| 4,387,801 A * | 6/1983 | Hoover | 198/847 |
| 5,211,609 A | 5/1993 | Haines | |
| 5,425,985 A | 6/1995 | Irvin | |
| 6,161,684 A * | 12/2000 | David | 198/847 |
| 6,216,852 B1 * | 4/2001 | David | 198/847 |
| 6,883,843 B2 * | 4/2005 | Van Damme et al. | 293/120 |
| 7,780,561 B2 * | 8/2010 | Nosaka et al. | 474/260 |
| 8,252,411 B2 * | 8/2012 | Veronesi et al. | 428/292.1 |
| 2005/0072658 A1 | 4/2005 | Nishikita | |

FOREIGN PATENT DOCUMENTS

| | | |
|---|---|---|
| EP | 0742382 | 11/1996 |
| GB | 816505 | 7/1959 |
| GB | 942765 | 2/1961 |
| GB | 1240123 | 7/1971 |
| PL | 53899 | 2/1996 |

OTHER PUBLICATIONS

P-403917 Search Report dated Sep. 25, 2013 (2 pages).
GB13086350 Great Britain Search Report dated Sep. 20, 2013 (5 pages).

* cited by examiner

*Primary Examiner* — Gene Crawford
*Assistant Examiner* — Lester Rushin
(74) *Attorney, Agent, or Firm* — Michael Best & Friedrich LLP

(57) ABSTRACT

A belt for a conveyor system generally includes a ribbon of elastomeric material and a plurality of reinforcing cords connected to the ribbon. The ribbon defines a central longitudinal axis and a pair of side edges extending parallel to the longitudinal axis. At least some of the cords have ends positioned between the longitudinal axis and a side edge.

26 Claims, 9 Drawing Sheets

BELT FOR A CONVEYOR SYSTEM

BACKGROUND

In underground mining, it is typical to employ a conveyor to haul or convey crushed ore out of a mine. The conveyor belt is typically made of a flexible elastomer. Through continued use, the conveyor belt may become worn and potentially torn along the side edges of the belt.

SUMMARY

The conveyor belt may include an assembly of a ribbon of elastomeric material and a layer of reinforcing cords positioned therein to provide stiffness or otherwise reinforce the belt. The reinforcing-cord layer typically includes a plurality of reinforcing cords that are oriented at an angle relative to a central longitudinal axis of the belt. The layer extends internally spaced from and substantially parallel to a side edge of the ribbon. During use, the ribbon of elastomeric material may become worn adjacent its side edges. When the wear extends to the inner reinforcing-cord layer, the assembly of the ribbon and reinforcing-cord layer may become delaminated along a side periphery of the reinforcing-cord layer and potentially torn. If this delamination or tear occurs, the conveyor belt must be removed and replaced, which can be time-consuming and cumbersome. Thus, there has developed a need for a conveyor belt that can resist delamination and tear during use and thereby provide a long service life.

In some embodiments, a belt for a conveyor system generally includes a ribbon of elastomeric material and a plurality of reinforcing cords connected to the ribbon. The ribbon defines a central longitudinal axis and a pair of side edges extending parallel to the longitudinal axis. At least some of the cords have ends positioned between the longitudinal axis and a side edge.

In other embodiments, a belt for a conveyor system generally includes a ribbon of elastomeric material and a pair of reinforcing-cord layers connected to the ribbon. The ribbon defines a central longitudinal axis and a pair of side edges extending parallel to the longitudinal axis. Each layer includes a plurality of cords having ends positioned between the central axis and a side edge. The ends in each layer can extend in a respective serrated pattern when viewed in a direction substantially perpendicular to the longitudinal axis.

In still other embodiments, a belt for a conveyor system generally includes a ribbon of elastomeric material and a pair of reinforcing-cord layers connected to the ribbon. The ribbon defines a central longitudinal axis and a pair of side edges extending parallel to the longitudinal axis. Each layer includes a plurality of cords having ends positioned between the central axis and a side edge to define a distance between the ends and the side edge. The distance between the ends and the side edge can vary from cord to cord. The pair of reinforcing-cord layers can include an overlapping portion that extends in a mesh pattern when viewed in a direction substantially perpendicular to the longitudinal axis.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Figure 1:
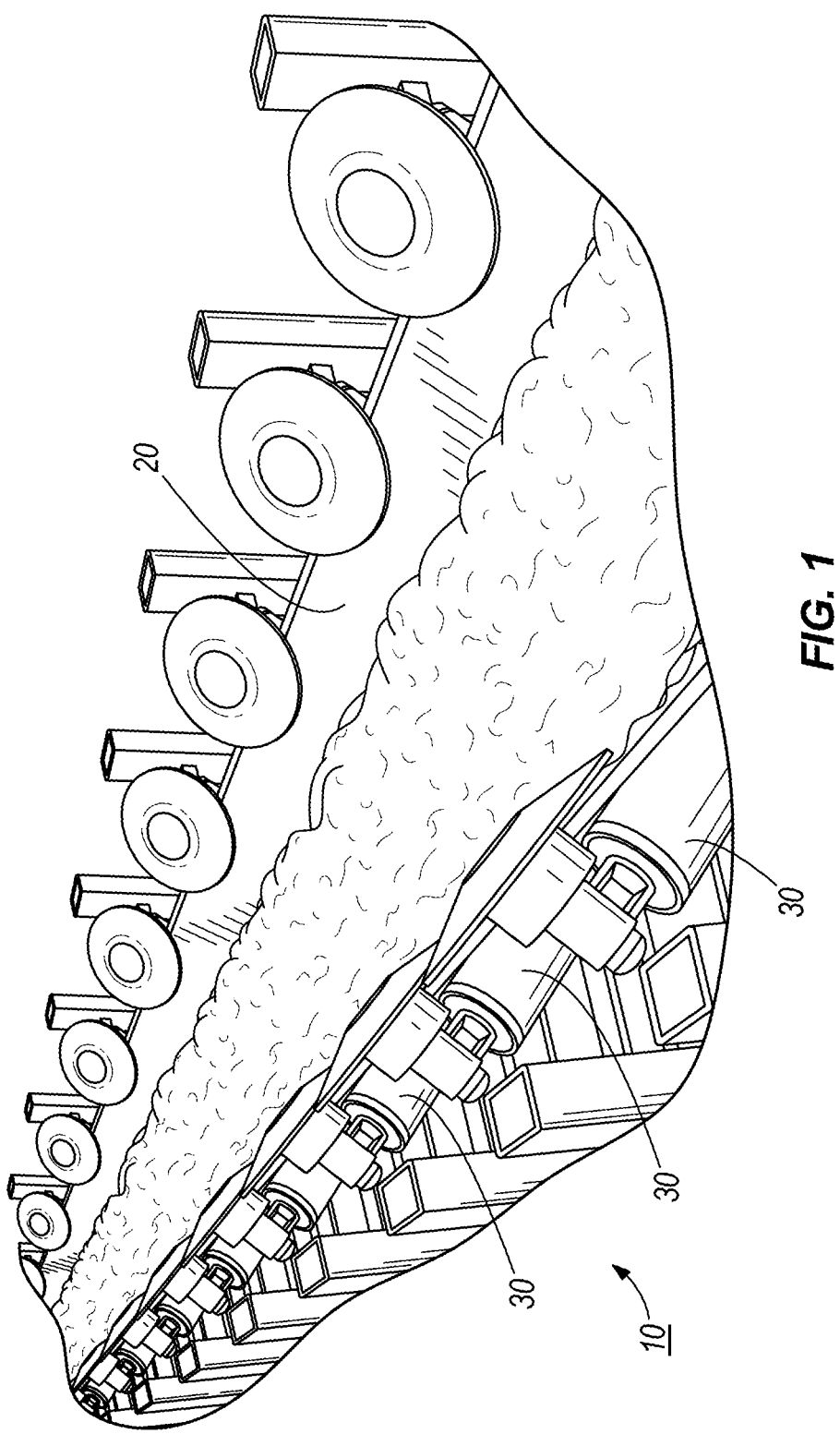
FIG. 1 is a perspective view of a conveyor system, illustrating a belt running on rollers.

FIG. 1 is a perspective view of a conveyor system 10. The conveyor system 10 includes a conveyor belt 20 extending in a conveying run (illustrated) and a return run (not shown), trough rollers 30 supporting the conveying run of the conveyor belt 20, and lower rollers (not shown) supporting the conveyor belt 20 in the return direction. The return run of the conveyor belt 20 is positioned below the conveying run and therefore not shown in the drawings. As used herein, the terms "top," "bottom," "front," "rear," "side," "above," "below," and other directional terms are not intended to require any particular orientation, but are instead used for purposes of description only.

Figure 2:
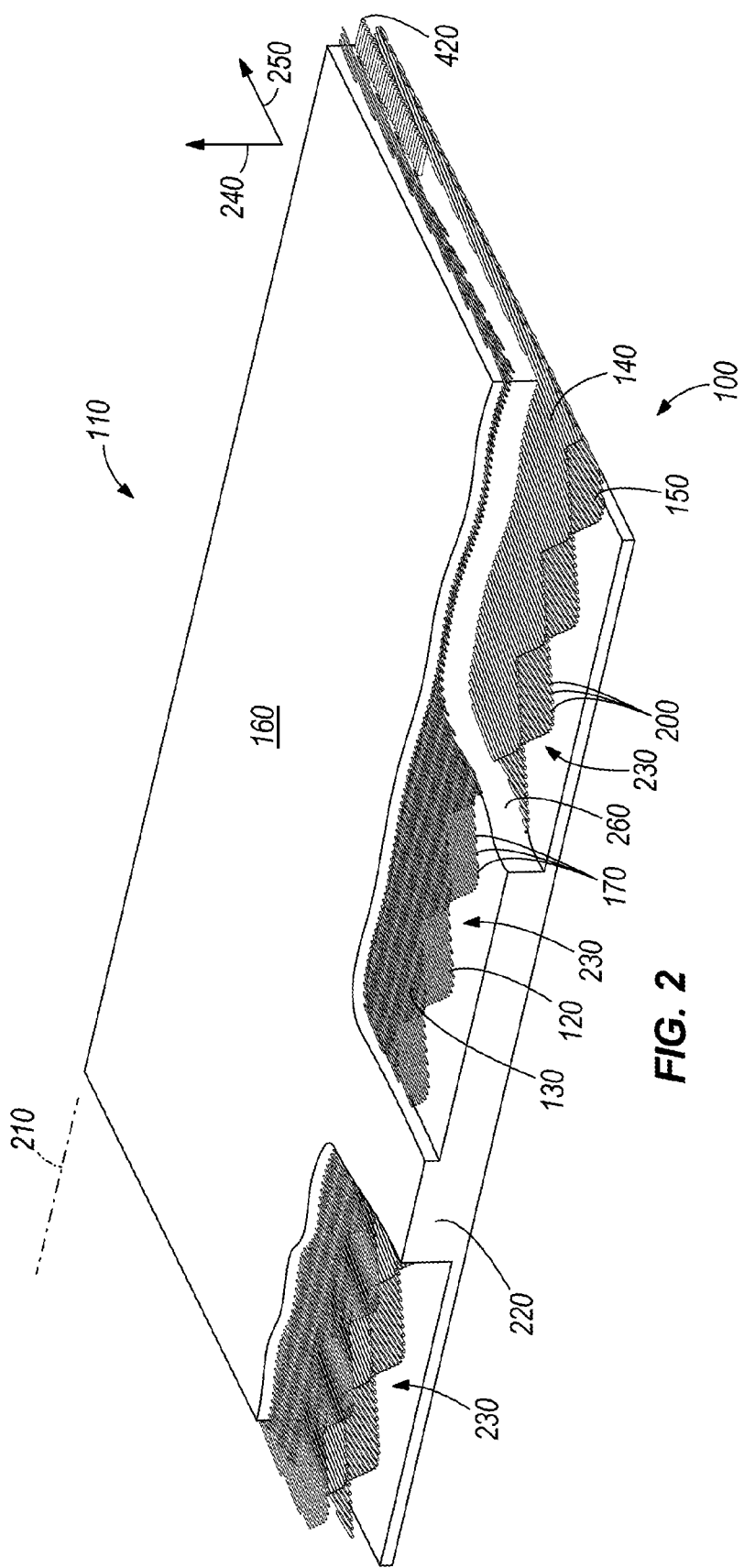
FIG. 2 is a perspective cutaway view of a belt according to an embodiment of the invention, illustrating a pair of outer reinforcing-cord layers and a pair of inner reinforcing-cord layers.
Figure 3:
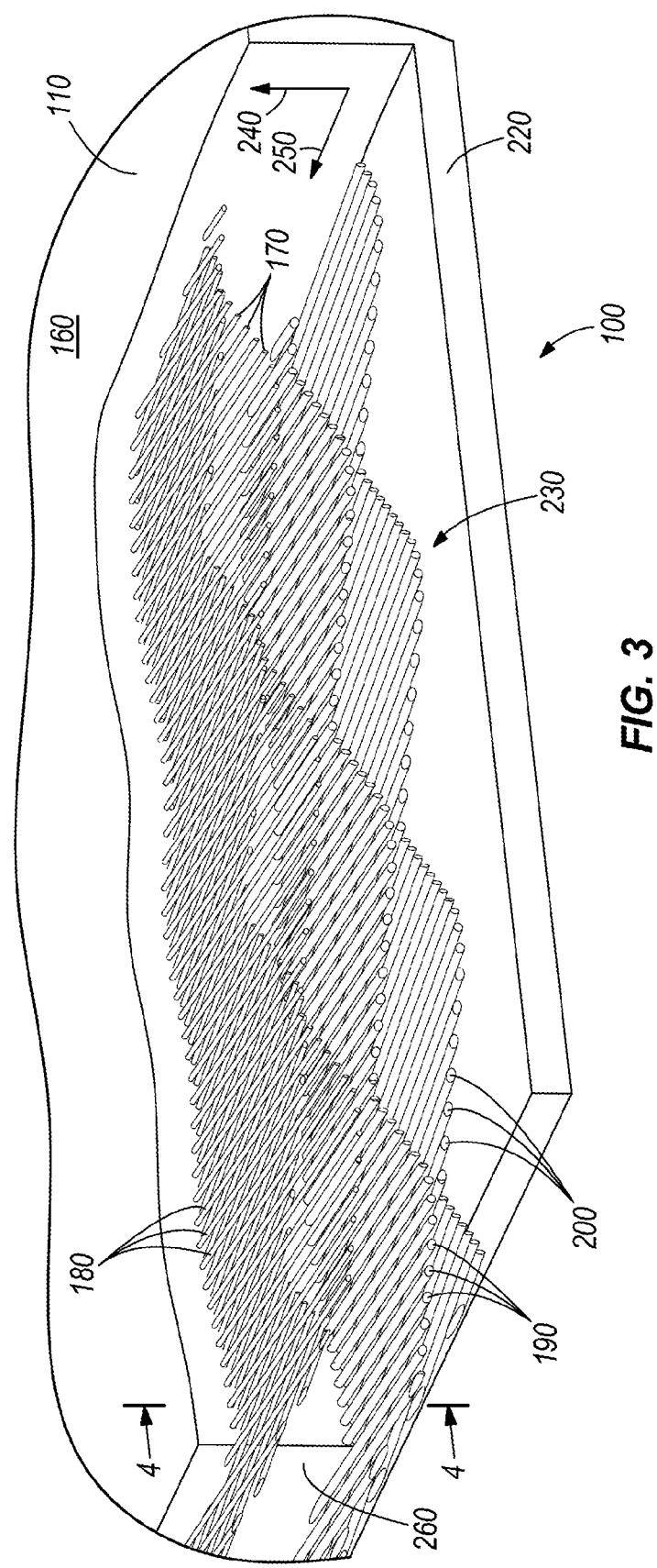
FIG. 3 is an enlarged partial perspective cutaway view of the belt of FIG. 2.
Figure 4:
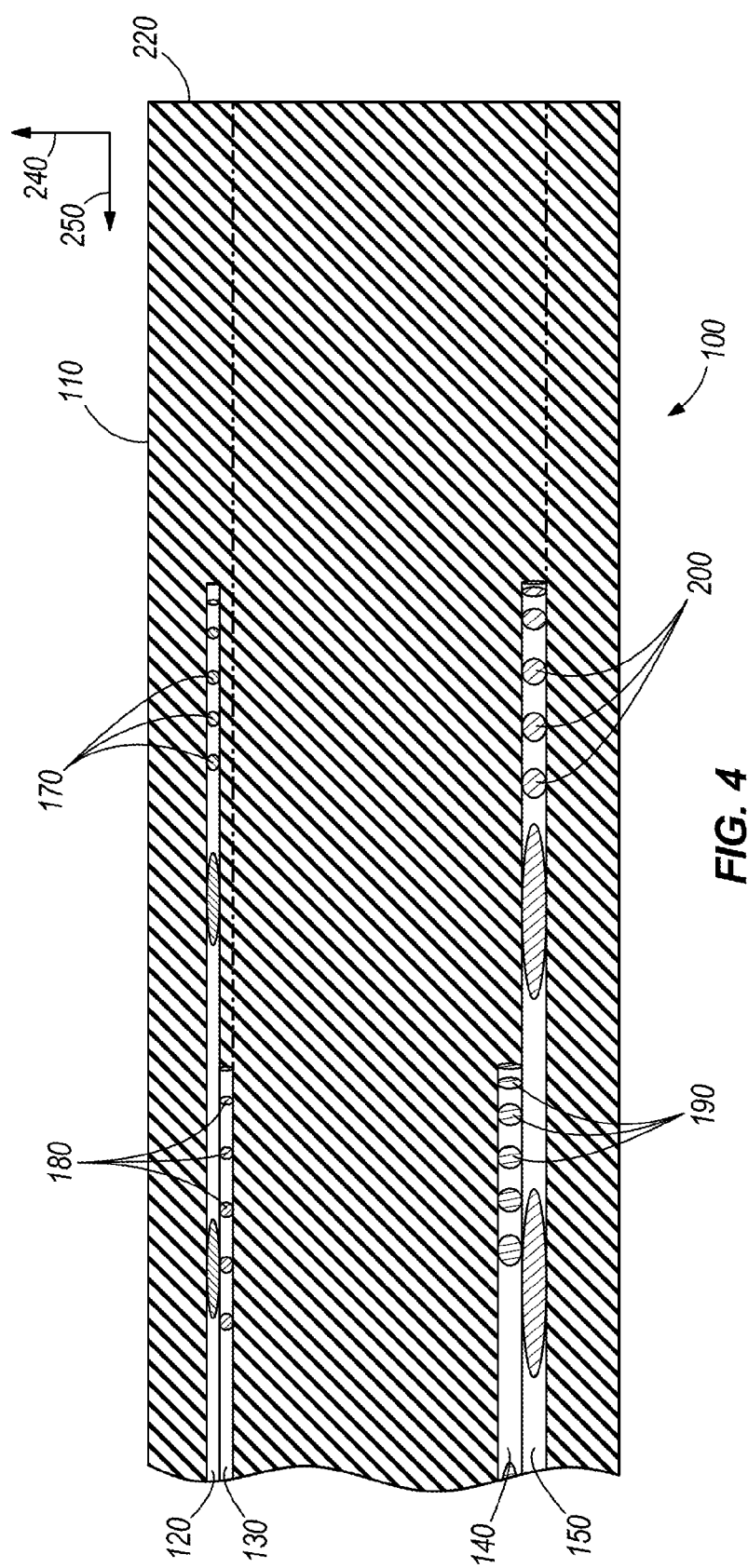
FIG. 4 is a cross-sectional view of the belt taken along line 4-4 of FIG. 3.

FIG. 2 illustrates a belt 100 for the conveyor system 10 according to an embodiment of the invention. The belt 100 generally includes a ribbon of elastomer or elastomeric material 110 and a plurality of reinforcing-cord layers 120, 130, 140, 150 (see FIG. 4) connected to the ribbon 110. In some embodiments, the elastomeric material of the ribbon 110 includes, but is not limited to, vulcanizable rubber and various compounds such as neoprene. The ribbon 110 includes an upper surface 160 on which the material to be conveyed may be placed and a lower surface (not shown) that is engaged by the trough rollers 30 and lower rollers of the conveyor system 10. Referring also to FIGS. 3 and 4, each reinforcing-cord layer 120, 130, 140, 150 includes a plurality of reinforcing cords 170, 180, 190, 200, respectively. The reinforcing cords 170, 180, 190, 200 are configured to provide a desired stiffness or otherwise reinforce the belt 100. As such, the reinforcing cords 170, 180, 190, 200 can be formed of a material with a suitable stiffness or strength, including, but not limited to, polyester. In other embodiments, one or more of the reinforcing cords 170, 180, 190, 200 are formed of metal, or made in other manners from other materials. Although the illustrated embodiment includes four reinforcing-cord layers 120, 130, 140, 150, it is to be appreciated that in other embodiments the belt 100 may include any other number of reinforcing-cord layers.

The ribbon 110 defines a central longitudinal axis 210 and a pair of side edges 220 extending parallel to the longitudinal axis 210. Only one half of the ribbon 110 relative to the longitudinal axis 210 is shown for clarity; the other half can be a mirror image thereof. In the illustrated embodiment, each layer of reinforcing cords 120, 130, 140, 150 is substantially symmetrical from a view along the longitudinal axis 210. In other embodiments, however, fewer than all of the layers 120, 130, 140, 150 may be substantially symmetrical from a view along the longitudinal axis 210.

In the illustrated embodiment, the reinforcing-cord layers 120, 130, 140, 150 each have an end portion 230 positioned between the longitudinal axis 210 and the side edge 220. In the illustrated embodiment, the distance between the side edge 220 and the ends 230 of the cords 170, 180, 190, 200 vary from cord to cord to create a serrated pattern when viewed in a vertical direction 240 substantially perpendicular to the longitudinal axis 210. In other embodiments, however, the distance between the ends 230 and the side edge 220 varies from cord to cord not necessarily in a serrated pattern. The term "varies from cord to cord" does not require a variance in the distance between the edge 220 and the ends 230 between each cord, but rather imply merely some variation in any pattern, which may be every other cord or in some other pattern.

Figure 5:
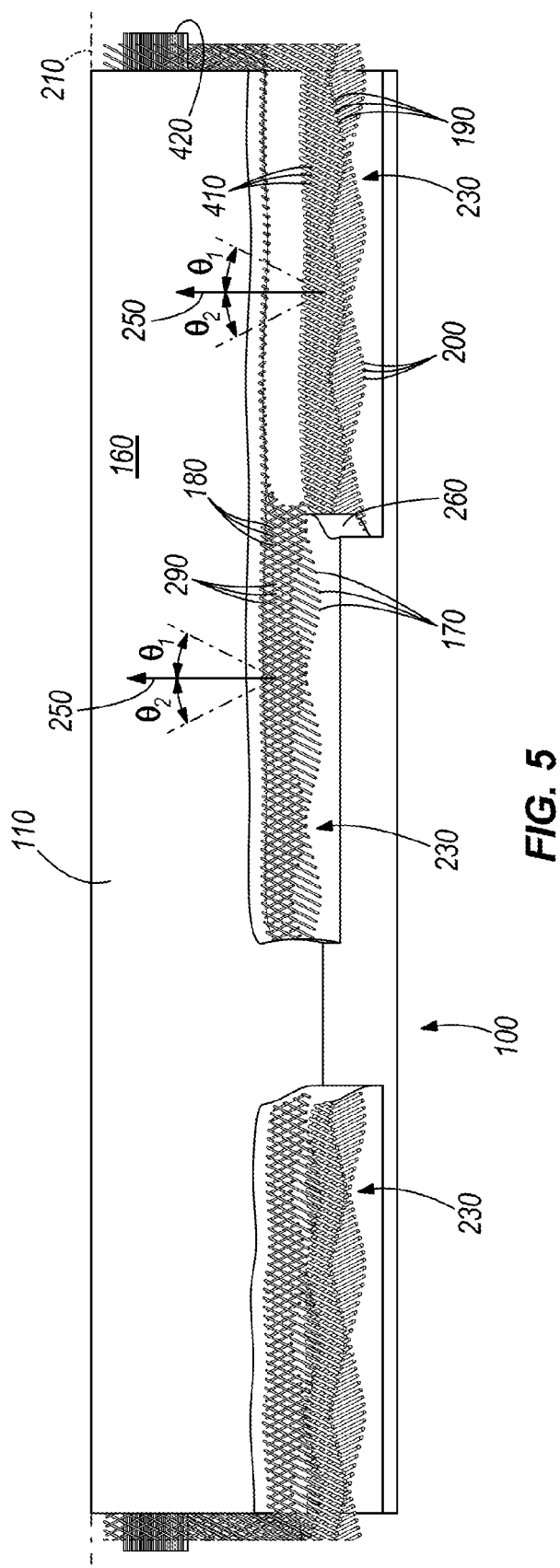
FIG. 5 is a side perspective cutaway view of the belt of FIG. 2.
Figure 8:
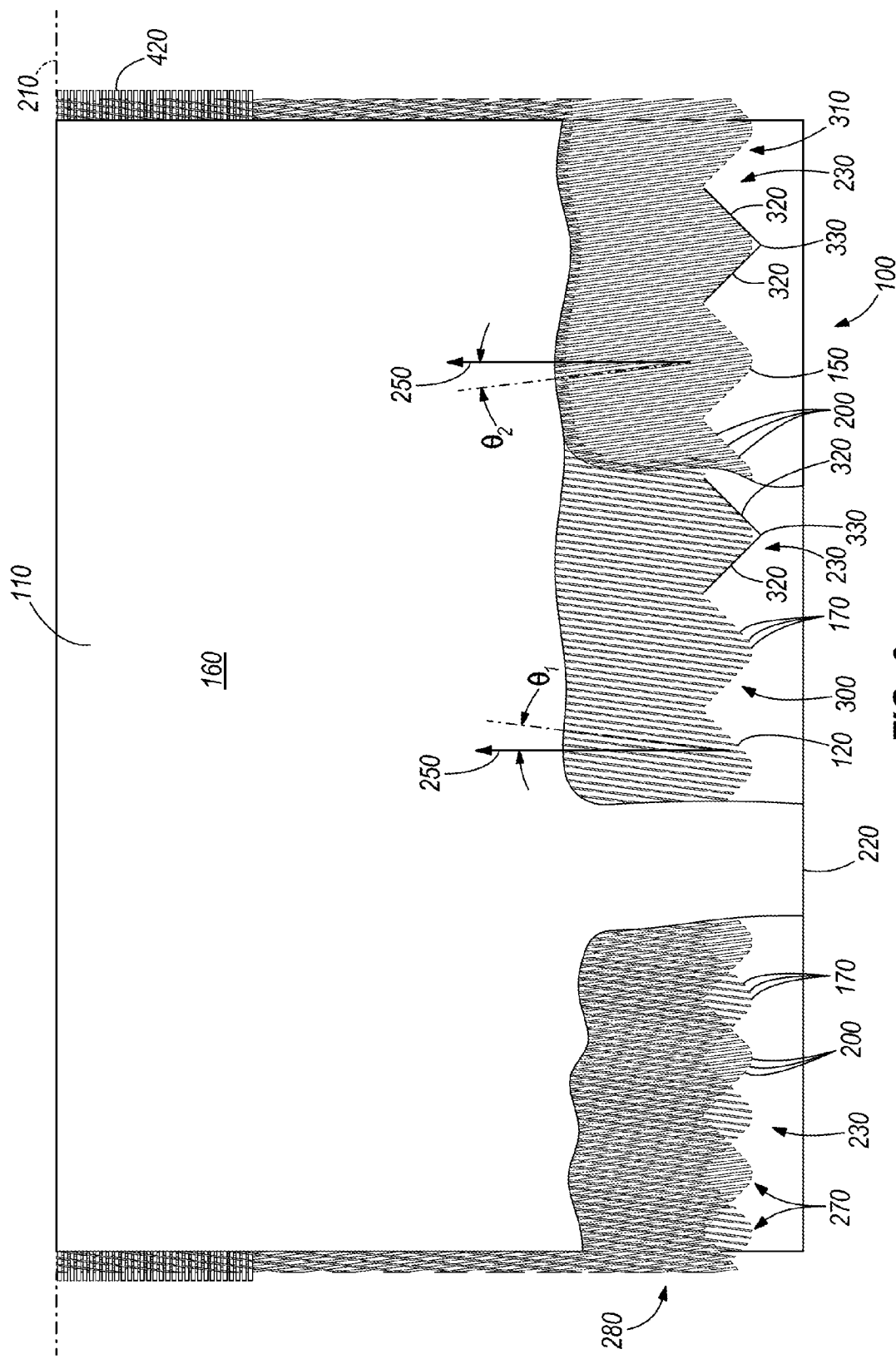
FIG. 8 is a side perspective cutaway view of the belt of FIG. 7.
Figure 9:
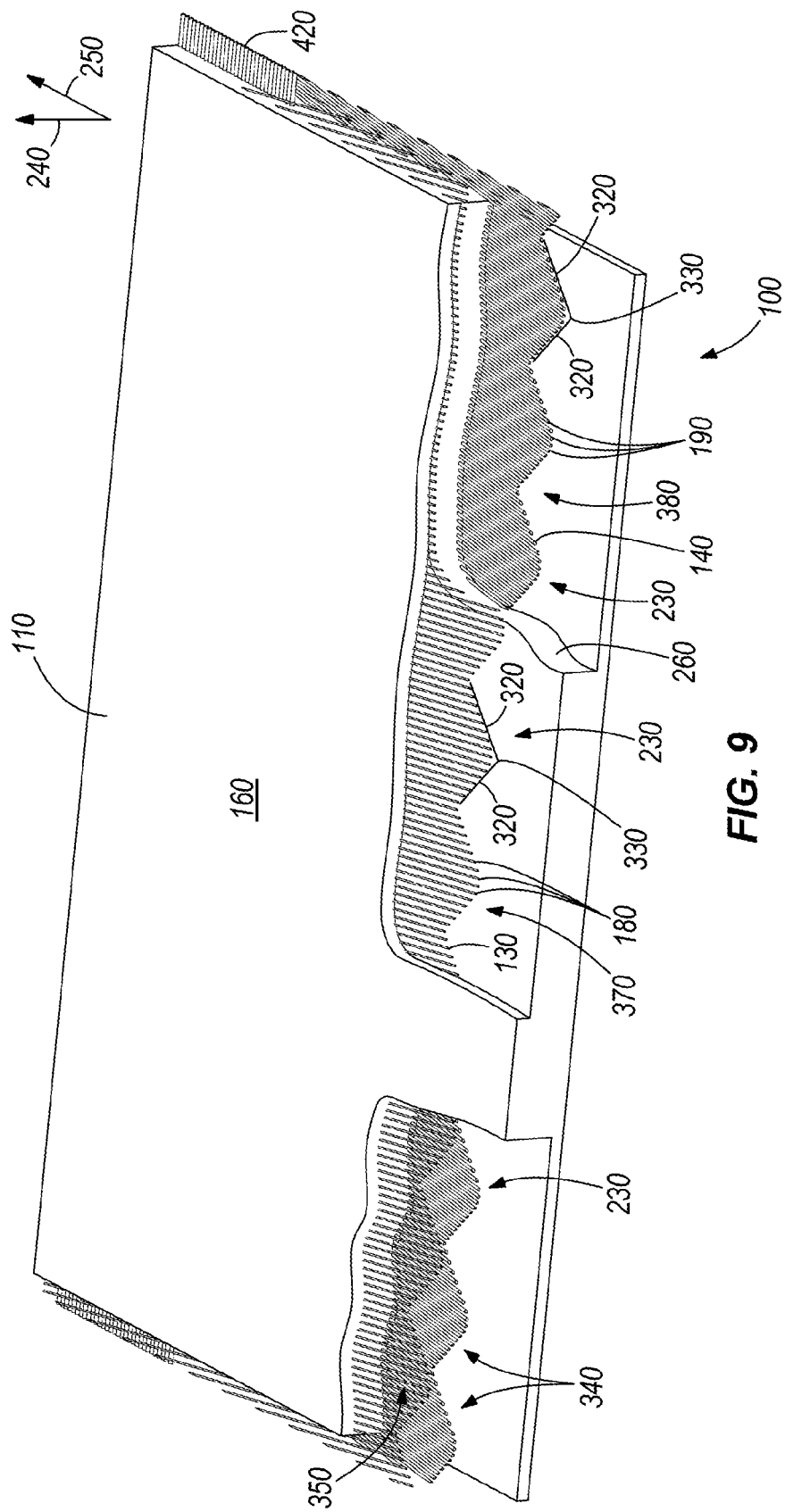
FIG. 9 is a perspective cutaway view similar to FIG. 2, illustrating the inner reinforcing-cord layers.

Referring also to FIG. 5, the four reinforcing-cord layers 120, 130, 140, 150 can be grouped into two pairs: the outer reinforcing-cord layers 120, 150 (see FIGS. 7 and 8) and the inner reinforcing-cord layers 130, 140 (see FIG. 9). Each pair includes a respective top layer 120, 130, and a respective bottom layer 140, 150. In the illustrated embodiment, the cords 170 of the top outer layer 120 and the cords 190 in the bottom inner layer 140 are each angled at a first acute angle $\theta_1$ relative to a transverse direction 250 substantially perpendicular to the longitudinal axis 210. Moreover, the cords 200 of the bottom outer layer 150 and the cords 180 of the top inner layer 130 are each angled at a second acute angle $\theta_2$ relative to the transverse direction 250. In the illustrated embodiment, the first acute angle $\theta_1$ is a negative angle, i.e., defined by a clockwise rotation when viewed from above, and the second acute angle $\theta_2$ is a positive angle, i.e., defined by a counterclockwise rotation when viewed from above. In other embodiments, however, the first acute angle $\theta_1$ is a positive angle and the second acute angle $\theta_2$ is a negative angle. In the illustrated embodiment, the first acute angle $\theta_1$ is approximately −7° relative to the transverse direction 250, and the second acute angle $\theta_2$ is approximately +7° relative to the transverse direction 250. Accordingly, the cords 170 of the top outer layer 120 are oriented at an angle of approximately 14° relative to the cords 200 of the bottom outer layer 150. Likewise, the cords 180 of the top inner layer 130 are oriented at an angle of approximately 14° relative to the cords 190 of the bottom inner layer 140. In other embodiments, however, the cords 170, 180, 190, 200 in each layer 120, 130, 140, 150 are oriented at other respective angles, and thus the cords 170, 180 of the top layers 120, 130 may be oriented at different angles relative to the cords 190, 200 of the bottom layers 140, 150.

In the illustrated embodiment, the top inner layer 130 is coupled to the top outer layer 120. Likewise, the bottom inner layer 140 is coupled to the bottom outer layer 150. In the illustrated embodiment, the coupled top layers 120, 130 are connected to the coupled bottom layers 140, 150 solely by a layer of elastomer 260. In further embodiments, the inner layers 130, 140 are connected to the respective outer layers 120, 150 with elastomeric material interposed therebetween. In the illustrated embodiment, the inner layers 130, 140 are each recessed relative to the outer layers of reinforcing cords 120, 150 toward the transverse direction 250. In other embodiments, however, fewer than all of the inner layers 130, 140 are recessed relative to the outer layers of reinforcing cords 120, 150 toward the transverse direction 250. In still other embodiments, one or more of the inner layers 130, 140 are substantially flush with, or protruding relative to the outer layers of reinforcing cords 120, 150 away from the transverse direction 250.

In some embodiments, the cords 190, 200 of the bottom layers 140, 150 are substantially heavier than the cords 170, 180 of the top layers 120, 130. This can be achieved, for example, by using cords with a larger diameter in the bottom layers 140, 150 relative to those in the top layers 120, 130. Alternatively, the bottom layers 140, 150 can be made heavier by using more cords than the top layers 120, 130. The heavier bottom layers 140, 150 are configured to provide a greater bending stiffness relative to the top layers 120, 130. As such, the lower surface of the belt 100 can be stiffer than the upper surface 160. Accordingly, when the belt 100 is positioned on a flat support structure such as in the return run, the lower surface of the belt 100 can resist flexing inward. On the other hand, when the belt 100 is positioned on a troughed shape such as in the conveying run, the upper surface 160 of the belt 100 can provide a suitably low stiffness to flex inward. In other embodiments, however, the cords 190, 200 of the bottom layers 140, 150 can be substantially lighter than or substantially the same weight as the cords 170, 180 of the top layers 120, 130.

Figure 6:
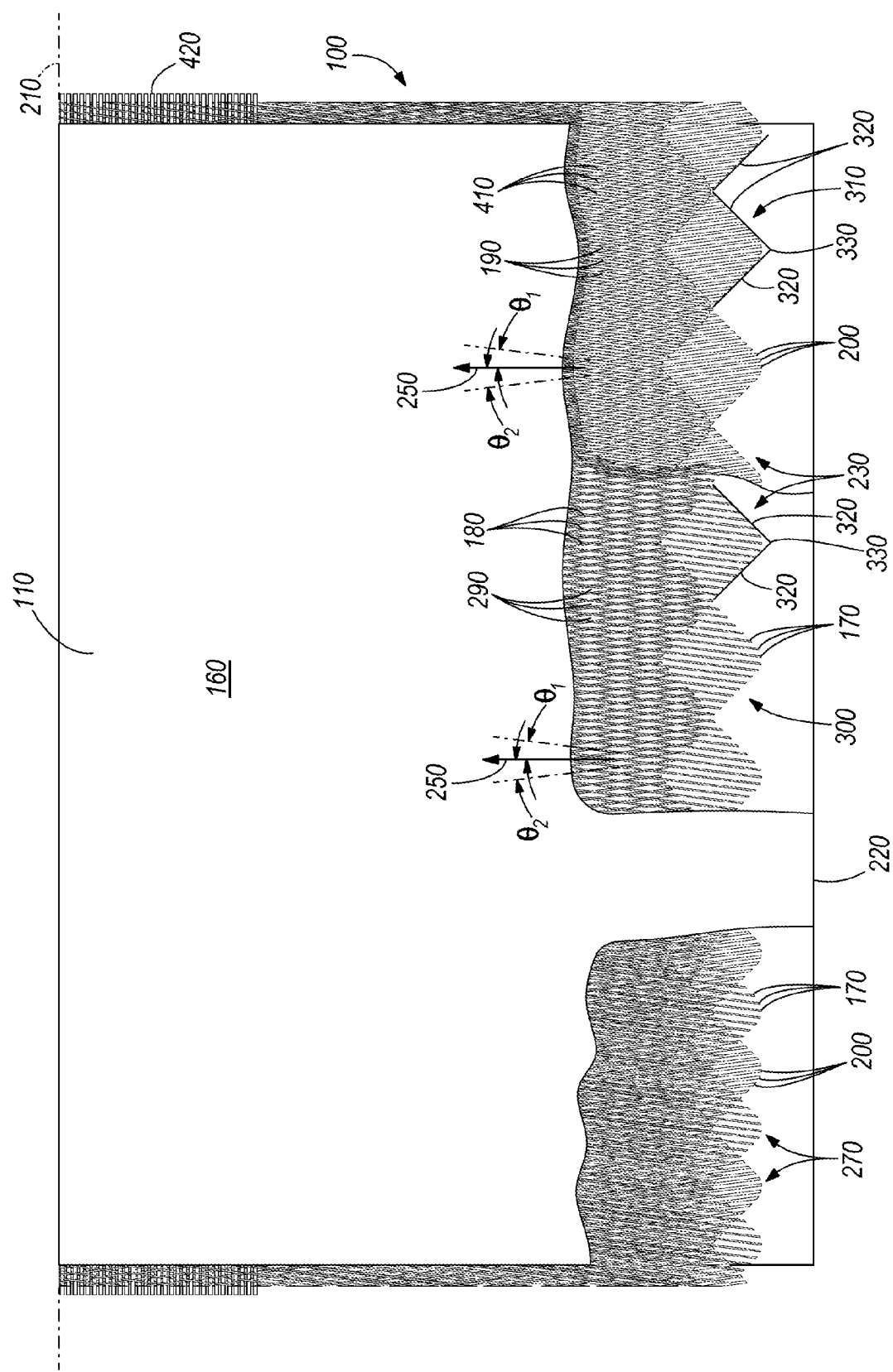
FIG. 6 is an enlarged side perspective cutaway view of the belt of FIG. 2.
Figure 7:
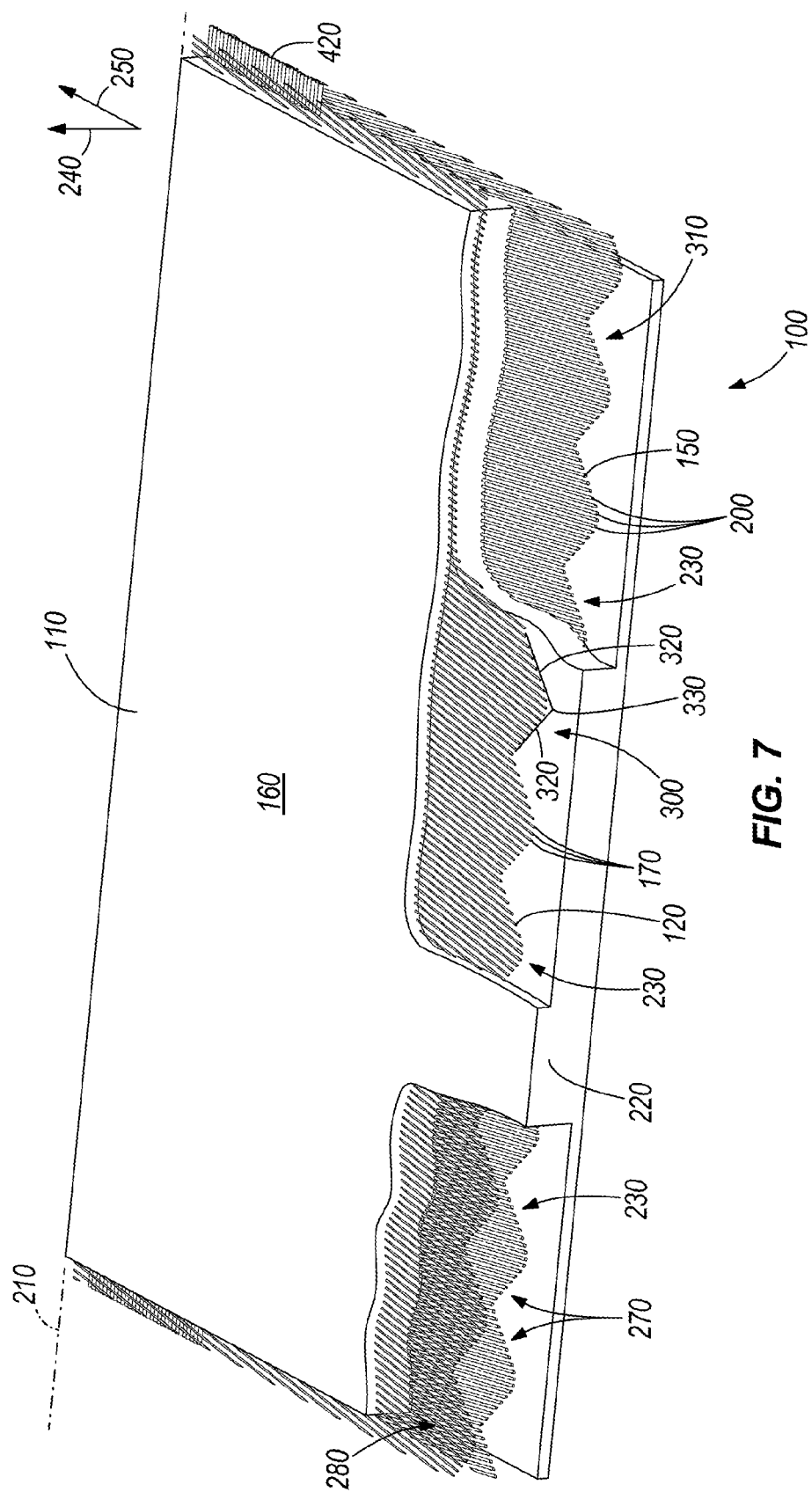
FIG. 7 is a perspective cutaway view similar to FIG. 2, illustrating the outer reinforcing-cord layers.

Referring also to FIGS. 6-8, the illustrated top outer layer 120 is laid out in a pattern forming a first set of serrations 300 and the illustrated bottom outer layer 150 has a second set of serrations 310. Each of the first and second sets of serrations 300, 310 include a plurality of edges 320 that are jointed together at triangular vertices 330. In some embodiments, the vertices 330 are substantially rounded. In the illustrated embodiment, the first and second sets of serrations 300, 310 extend in an alternate pattern along the side edge 220 of the belt 100. As such, the triangular vertices 330 of the first and second serrations 330, 310 define non-overlapping portions 270 of reinforcing cords 170, 200 when viewed in the vertical direction 240. In some embodiments, the pair of outer layers 120, 150 may include a non-overlapping portion without necessarily including the illustrated alternate first and second serrations 300, 310. In the illustrated embodiment, the pair of outer layers 120, 150 also includes an overlapping portion 280 that extends in a mesh pattern when viewed in the vertical direction 240.

The illustrated outer layers 120, 150 can help withstand delamination and tear during use of the belt 100. During use, the belt 100 becomes worn, with the wear surface advancing substantially parallel to the side edge 220. If the wear surface contacts the outer layers 120, 150, the outer layers 120, 150 will not be exposed along the entire side peripheries, because the distance between the ends 230 and the side edge 220 varies from cord to cord, e.g., along the serrations 300, 310. By exposing less than all of the entire side peripheries of the outer layers 120, 150 during wear, delamination of the layers 120, 150 can be substantially resisted. Moreover, in the illustrated embodiment with the first and second serrations 300, 310 extending in an alternate pattern, the exposed vertices 330 of the outer layers 120, 150 during wear will be at a greater distances from one another compared to a configuration where the first and second serrations 300, 310 extend in unison when viewed in the vertical direction 240. During wear, there may be cracks initiating from exposed vertices 330. If these cracks are linked together, delamination or tear might occur. The non-overlapping portions 270 of the reinforcing cords 170, 200 help extending the length between exposed vertices 330 of the layers 120, 150 during wear, thereby substantially resisting delamination and tear.

Referring also to FIG. 9, the illustrated top inner layer 130 is laid in a pattern forming a third set of serrations 370 and the illustrated bottom inner layer 140 has a fourth set of serrations 380. Like the first and second serrations 300, 310, the third and fourth serrations 370, 380 can help withstand delamination and tear during use of the belt 100 by exposing less than all of the entire side peripheries of the layers 130, 140 during wear. In the illustrated embodiment, the third and fourth sets of serrations 370, 380 extend in an alternate pattern along the side edge 220 of the belt 100, and are recessed relative to the first and second serrations 300, 310 toward the transverse direction 250. As such, the illustrated pair of inner layers 130, 140 includes non-overlapping portions 390 of reinforcing cords 180, 190 when viewed in the vertical direction 240. In some embodiments, the third and fourth sets of serrations 370, 380 may not be recessed relative to the first and second serrations 300, 310 toward the transverse direction 250. In further embodiments, the pair of inner layers 130, 140 may include a non-overlapping portion without necessarily including the alternate third and fourth serrations 370, 380. Like in the first and second serrations 300, 310, the non-overlapping portions 390 of the third and fourth serrations 370, 380 extend the length between exposed portions of the layers 130, 140 during wear, which can help resisting delamination. In the illustrated embodiment, the pair of inner layers 130, 140 also includes an overlapping portion 350 that extends in a mesh pattern when viewed in the vertical direction 240.

Referring again to FIGS. 5 and 6, the illustrated cords 170, 180 of the top layers 120, 130, respectively, overlap in a mesh pattern when viewed in the vertical direction 240. The mesh pattern in the pair of top layers 120, 130 is defined by intersecting cords 170, 180 and interstices 290 formed therein. The interstices 290 are used to embed the cords 170, 180 in the ribbon 110 during vulcanization, as will be explained further below. Likewise, the illustrated cords 190, 200 of the bottom layers 140, 150, respectively, overlap in a mesh pattern when viewed in the vertical direction 240. The mesh pattern in the pair of inner layers 130, 140 is defined by intersecting cords 180, 190 and interstices 410 formed therein. The interstices 410 are used to embed the cords 180, 190 in the ribbon 110 during vulcanization, as will be explained further below.

In assembly of the belt 100, an assembly of layers is vulcanized at a reaction temperature. The assembly of layers includes the ribbon of elastomeric material 110 and the reinforcing cords 170, 180, 190, 200 connected to the ribbon 110. In some embodiments, the assembly of layers is vulcanized at a reaction temperature above 100° C. In further embodiments, the assembly of layers is pressurized during vulcanizing, e.g., to a pressure of approximately two MPa for approximately one hour. During vulcanizing, the elastomeric material 110 passes into the interstices 290, 410 between the cords 170, 180, 190, 200 in the layers 120, 130, 140, and 150.

In some embodiments, the belt 100 optionally includes a stretch limiter 420 positioned within the ribbon 110 along the longitudinal axis 210. The stretch limiter 420 can provide resistance to tension along the longitudinal axis 210 once the belt 100 is elongated by a predetermined amount. For example, in some embodiments the belt 100 can be elongated up to approximately 10%, after which the stretch limiter 420 will resist further elongation. In some embodiments, the stretch limiter 420 is made of a woven fabric material, such as Kevlar® by E. I. du Pont de Nemours and Company.

Although the invention has been described in detail with reference to certain preferred embodiments, variations and modifications exist within the scope and spirit of one or more independent aspects of the invention as described.

What is claimed is:

1. A belt for a conveyor system, the belt comprising:
    a ribbon of elastomeric material defining a central longitudinal axis and a pair of side edges extending parallel to the longitudinal axis, the central longitudinal axis defining a direction of travel of the belt along the conveyor system;
    a first layer of reinforcing cords connected to the ribbon and extending lengthwise between the pair of side edges;
    a second layer of reinforcing cords connected to the ribbon and extending lengthwise between the pair of side edges;
    a third layer of reinforcing cords connected to the ribbon and extending lengthwise between the pair of side edges; and
    a fourth layer of reinforcing cords connected to the ribbon and extending lengthwise between the pair of side edges;
    wherein ends of the cords in each of the first, second, third, and fourth layers are positioned between the longitudinal axis and one of the side edges, and wherein the ends of the cords in at least one of a group consisting of the first, second, third, and fourth layers extend in a serrated pattern along a direction parallel to the longitudinal axis when viewed in a direction perpendicular to the longitudinal axis and perpendicular to an axis extending between the pair of side edges.

2. A belt as set forth in claim 1, wherein the ends of the cords define a distance between the ends and the side edge, and wherein the distance between the ends and the side edge varies from cord to cord.

3. A belt as set forth in claim 1, wherein the first and second layers of reinforcing cords include a non-overlapping portion of reinforcing cords when viewed in a direction perpendicular to the longitudinal axis.

4. A belt as set forth in claim 1, wherein the reinforcing cords of the first and second layers include an overlapping portion that extends in a mesh pattern when viewed in a direction perpendicular to the longitudinal axis.

5. A belt as set forth in claim 1, wherein the third and fourth layers of reinforcing cords include a non-overlapping portion of reinforcing cords when viewed in a direction perpendicular to the longitudinal axis.

6. A belt as set forth in claim 1, wherein the first and third layers are connected to the second and fourth layers solely by a layer of elastomer.

7. A belt as set forth in claim 1, wherein the cords of the second and fourth layers are substantially heavier than the cords of the first and third layers.

8. A belt as set forth in claim 1, wherein the cords in the first and fourth layers are each angled at a first acute angle relative to a direction that is perpendicular to the longitudinal axis, and the cords in the second and third layers are each angled at a second acute angle relative to the direction that is perpendicular to the longitudinal axis, one of the first and second acute angles being a positive angle and the other being a negative angle.

9. A belt as set forth in claim 1, wherein the third and fourth layers of reinforcing cords are each recessed relative to the first and second layers of reinforcing cords toward a direction perpendicular to the longitudinal axis.

10. A belt as set forth in claim 1, wherein the reinforcing cords are substantially symmetrical from a view along the longitudinal axis.

11. A belt as set forth in claim 1, wherein the ends of the cords in each of the first, second, third, and fourth layers extend in a serrated pattern when viewed in a direction perpendicular to the longitudinal axis and perpendicular to an axis extending between the pair of side edges.

12. A belt as set forth in claim 1, wherein the elastomeric material includes vulcanized rubber.

13. A belt for a conveyor system, the belt comprising:
a ribbon of elastomeric material defining a central longitudinal axis and a pair of side edges extending parallel to the longitudinal axis, the central longitudinal axis defining a direction of travel of the belt along the conveyor system; and
a pair of reinforcing-cord layers connected to the ribbon, each of the layer including a plurality of cords extending lengthwise between the pair of side edges;
wherein the cords in one of the layers are angled at an acute angle relative to a direction that is perpendicular to the longitudinal axis, and wherein the ends of the cords in at least one of the layers extend along a direction parallel to the longitudinal axis in a serrated pattern when viewed in a direction perpendicular to the longitudinal axis and perpendicular to an axis extending between the two side edges.

14. A belt as set forth in claim 13, wherein the pair of layers includes a non-overlapping portion of reinforcing cords when viewed in a direction perpendicular to the longitudinal axis.

15. A belt as set forth in claim 13, further comprising a second pair of reinforcing-cord layers, each of the second pair of layers coupled to a respective layer of the pair of layers, and wherein the second pair of layers includes a non-overlapping portion of reinforcing cords when viewed in a direction perpendicular to the longitudinal axis.

16. A belt as set forth in claim 15, wherein the second pair of layers are connected to each other solely by a layer of elastomer.

17. A belt as set forth in claim 15, wherein the second pair of layers is recessed relative to the pair of layers in a direction perpendicular to the longitudinal axis.

18. A belt as set forth in claim 13, wherein ends of the cords in each of the layers extend in a serrated pattern when viewed in a direction perpendicular to the longitudinal axis and perpendicular to an axis extending between the pair of side edges.

19. A belt as set forth in claim 13, wherein the acute angle is approximately 7 degrees.

20. A belt for a conveyor system, the belt comprising:
a ribbon of elastomeric material defining a central longitudinal axis and a pair of side edges extending parallel to the longitudinal axis the central longitudinal axis defining a direction of travel of the belt along the conveyor system;
a first pair of reinforcing-cord layers connected to the ribbon, the first pair including a top layer and a bottom layer; and
a second pair of reinforcing-cord layers, the second pair connected to the ribbon and including a top layer and a bottom layer, each of the top and bottom layers of the first and second pairs including a plurality of cords extending lengthwise between the pair of side edges, the cords having ends disposed between the central longitudinal axis and one of the side edges;
wherein the top and bottom layers of the first and second pairs are alternated such that the top layer of the second pair is disposed below the top layer of the first pair, the bottom layer of the first pair is disposed below the top layer of the second pair, and the bottom layer of the second pair is disposed below the bottom layer of the first pair, and wherein the ends of the top and bottom layers of the first pair are recessed relative to the ends of the top and bottom layers of the second pair along a direction that extends between the pair of side edges and is perpendicular to the longitudinal axis.

21. A belt as set forth in claim 20, wherein the second pair of layers includes a non-overlapping portion of reinforcing cords when viewed in a direction perpendicular to the longitudinal axis.

22. A belt as set forth in claim 21, wherein the second pair of layers are connected to each other solely by a layer of elastomer.

23. A belt as set forth in claim 20, wherein the first and second pairs of layers are substantially symmetrical from a view along the longitudinal axis.

24. A belt as set forth in claim 20, wherein the first and second pairs of layers each includes an overlapping portion that extends in a mesh pattern when viewed in a direction perpendicular to the longitudinal axis.

25. The belt as set forth in claim 1, wherein the serrated pattern defines vertices having a triangular or rounded shape.

26. The belt as set forth in claim 25, wherein the serrated pattern defines vertices having a triangular or rounded shape.

* * * * *